Patented Dec. 12, 1950

2,533,585

UNITED STATES PATENT OFFICE 2,533,585

PROCESS OF MAKING REFRACTORY MOLDS

Fred O. Johnson, Anchorage, Territory of Alaska

No Drawing. Application April 11, 1947,
Serial No. 740,977

4 Claims. (Cl. 25—156)

This invention relates to improved process of production from plastic materials of durable molded articles; and more particularly to a process of indurating or impregnating the plastic material from which the articles are formed, with silicon esters after molding and drying thereof, a primary object of the invention being the production of plastic molded articles of superior hardness, strength, and acid-and moisture-resistance, and polishability, in a quicker and more efficient manner whereby production costs and waiting time are substantially lowered.

Another important object of this invention is to provide a process whereby molded or sculptured articles may be conveniently produced from the clays and other plastic materials ordinarily cold-worked or cold-molded in the sculpturing and molding arts, so that sculptured or molded clay articles in a completed or semi-finished form and in plastic condition may be quickly and efficiently hardened to possess the desirable characteristics indicated above.

Another important object of this invention is to provide a process of the character indicated above employing plastic material containing absorbent cotton or similar fibers, which increase the amount of silicon solution absorbed by the material and in themselves increase the tensile strength of the articles.

A further important object of this invention is to provide a simple and efficient process of the character indicated above which results in the impregnation of the formed porous plastic materials with a set silicon dioxide binder, which can extend throughout the material or be confined to selected areas or portions thereof.

Another important object of this invention is to provide a simple, efficient, convenient and low cost process whereby all porous materials, in which silica can be precipitated out of silicon ester solutions, including clay, refractory sand, alumina, powdered silica, zirconia, graphite and the like, can be stiffened and hardened and strengthened, with entrained reinforcing fibers present or absent, so as to provide durable articles having the desirable properties set forth herein.

Other important objects and advantageous features of this invention will be apparent from the following description and the examples which are therein specifically set forth for purposes of non-limitative illustration of this invention.

While the present invention especially contemplates the sculpturing and molding arts, it will be clear that it has equal application to other arts, such as the building and relater arts as hereinafter pointed out.

In the cases of the sculpturing and molding arts, employing ordinary conventional cold-molding clay, the invention finds application in the hardening and strengthening and waterproofing of the sculpted or molded clay articles. In preparation for and in contemplation of this the following steps and operations are employed:

(1) Bring to a boil in a suitable vessel a mixture of plastic clay and water having a viscosity similar to that of molasses.

(2) While keeping the mixture boiling introduce therein slowly "exploded" or finely divided cotton fibers, permitting the boiling action and mechanical stirring to intimately distribute the fibers evenly throughout the clay. The amount of fibers then introduced determines the moldability or plasticity of the resultant molding clay, and the strength of the final product or molded article, the greater the amount of fibers introduced, the greater the viscosity of the molding clay and the stronger the final product or molded article.

(3) Pigments or other material in powdered form, such as graphite where desired, affecting the color or texture or polishability of the molded articles, may now be introduced into the boiling mixture and distributed evenly therethrough, account being taken of the fact that the final color, tone, and shade are altered in varying degrees by dehydration, adulterations which may be present in the clay, and slight darkening resulting from the chemical treatment of the article for the deposition of silica therein.

(4) Boiling of the mixture is continued until surplus water has been driven off, leaving a plastic mass of the desired moldability or plasticity.

(5) An article or articles are sculpted or molded from the plastic mass and then dried thoroughly, preferably by artificial means, at a temperature no higher than 180° F.

(6) The dried article or articles are then subjected to contact with silicon ester solution, preferably an ethyl silicate solution (40% or 28%), such as disclosed as a bonding agent in the Ray Patent No. 2,027,932, granted January 14, 1936, and in the King et al. Patent No. 1,809,755, for porous materials.

While the use of ethyl silicate is preferred, the use of methyl silicate, amyl silicate, and/or related silicon ester solutions and mixtures thereof, are contemplated, and any solution containing solvents employed in the manufacture of silicon esters, other than alcohols such as ethyl, methanol, amyl, butyl, ketones and the like; as well as any silicon ester solutions having adulterants such as linseed oil, mineral oils, turpentine or such agents as carbon tetrachloride, bromnaphthalene or soluble synthetic resins.

The subjection of the dried molded or sculpted article to silicon ester solution is accomplished preferably by immersion thereof in a silicon ester solution devoid of hydrolizing agencies. Heretofore hydrolizing agencies such as alcohol, water, and dilute mineral acids have been added to the silicon ester solution used for silica deposition in porous materials. These combine with the silicon ester solution in a complex and difficultly controllable chemical reaction which produces alcohol and silicic acid, the last then dehydrating to an amorphous form of silica. However, in accordance with the present invention provision is made for hydrolizing the silicon ester solution absorbed in the dried porous plastic article in a much more simple and efficient manner avoiding the incorporation of such hydrolizing agencies in the silicon ester solution, the desired result being induced and accelerated by applying the necessary hydrolysis producing agencies to the silicon ester solution by means of mechanical aids, after the ester solution has been absorbed into the porous article.

The dried molded article is immersed in a silicon ester solution containing preferably 40% silica available for deposition, the immersion being continued only to the point necessary to enable the article to absorb the solution or until air bubbles have ceased rising therein, indicating saturation. Where the clay or the like plastic material forming the article contains absorbent cotton or other fibers, the fibers provide means for escape of air from the pores of the clay body preventing crumbling which might otherwise be produced by the rapid penetration of the clay body by the solvents present in the silicon ester solution.

The absence of hydrolizers from the silicon ester solution during immersion of the molded article, as contemplated by the present invention, assures maximum silica in the article as a consequence of immersion in the solution. However, it is found that other adulterants up to 50% by volume, such as spirits of turpentine, can be added to the silicon ester solution, before the solution is applied to the porous molded article, without ill effect upon the treatment of the article, and in some instances with resultant desirable characteristics in the final product, besides savings in the cost of silicon ester solution.

In instances wherein the silicon ester solution does not contain adulterant oils and the like, the final product, although chemically resistant to water, exhibits a tendency to absorb moisture by reason of its inherent porosity. This does not produce any alteration in the strength of the article over substantial periods of time, except increase in the hardness thereof. However, when adulterants, such as spirits of turpentine are used in the silicon ester solution, the final product exhibits little or none of this water absorbency.

While cool or merely warm water has the tendency to increase the hardness of the silicon ester treated articles, if such an article be immersed in boiling water for a few minutes, the silicon dioxide bond becomes disengaged and slow disintegration of the article ensues, the clay or the like resuming most of its original plasticity with water lubrication. This feature may be used to advantage where disintegration of a final product may be desired, since it is a practical and convenient means of doing what otherwise can be done only by applying distructive force to the article.

Where refractory properties in the final product fitting it for some restricted uses as a crucible plastic for certain metal molding processes are desired, these may be induced in the product by mixing with the clay and fiber mixture, before immersion in the silicon ester solution, suitable powdered material such as graphite, up to about 20% by volume. The final product, produced by molding and solution treatment of the graphite-containing plastic mixture, offers substantial resistance to heat, moisture, friction, concentrated acids and other chemicals, and can be given a high polish.

It is to be noted that the costs of operating processes in accordance with the present invention may be reduced by using appropriate adulterants in and mixtures of silicon ester solutions to a point whereat use of the processes for the economical production of artificial tile, brick, roofing material, and the like, is feasible.

(6a) The immersion of the dried molded article in the silicon ester solution without danger of disintegration may be facilitated where the articles, such as statuettes, are relatively small and the plastic material is devoid of strengthening and integrating fibers, by the use of suitable mechanical means of supporting the dried clay forms and very slowly immersing them in the solution, the immersing action being timed to allow time for escape of air from the areas of the articles penetrated by the solvent in the solution, thereby avoiding separation of the clay particles.

(6b) Where more complete filling of the pores of the molded article with silicon dioxide with the object of rendering the same less moisture absorbent and stronger is desired, the step of saturating the article with silicon ester solution and the step of hydrolization, hereinafter described, may be repeated more than one time.

(7) The silicon ester solution saturated article is next placed in a pressure resistant chamber wherein the article can be subjected to a pressure of between 10 and 550 pounds per square inch in the presence of a "wet" water-ammonia vapor of a concentration of between 5% and 28% of ammonia. The principle is the subjection of the silicon ester absorbed within the clay to alkaline water vapor at the highest practicable pressure, with the natural heat of the vapors aiding in penetrating the pores of the article and the fibers.

In this way, which enables keeping the area of treatment and the pressurized vapors relatively cool, volatilizing of the alcohol in the silicon ester solution is held down so as to give the ester a better opportunity for hydrolysis and deposition of silica within the pores of the article. The length of time required (between 3 and 15 hours) for complete precipitation of available silica depends upon the degree of pressurization, the ammonia concentration, the size of the article, the temperature of the area of treatment, and the type of silicon ester used, all of which are variable factors.

(8) For the purpose of converting the silica, deposited in the pores of the article by the foregoing steps, into silicon dioxide binder having maximum adhesive properties, the article is next submitted to pressurization similar to step (7) but in the presence of a "dry" vapor, as contrasted with a "wet" vapor, for a period of at least two hours after the alcohol solvent in the silicon ester solution present in the pores of the article has been driven off. The "dry" vapor employed at the last phase of pressurization appears to "set" the silicate dioxide binder more quickly and with more durable results.

The length of time the article is subjected to the "dry" vapor pressurization depends upon the degree of polish the finished article is to receive. The finished product should take a high polish, be waterproof, resistant to most corrosive chemicals, be dielectric, light-weight, and low cost, where methyl or amyl silicates are employed.

It should be noted that the purpose of combining ammonium hydroxide with a proportion of water and contacting the silicon ester solution treated molded article with the vapors thereof under pressure is to accelerate and rapidify the reaction of hydrolysis of the ester. However in practical applications, the alkaline nature of the vapor is not indispensable and ordinary steam pressure may be substituted, and desirably so, since the use of alkaline and other accelerators is often accompanied by the need for a neutralizing reagent or other means of cancelling out the alkaline activity within the finished product. Where accelerators are used to speed up and complete the hydrolysis and convert the esters into silicate dioxide binder, the article should be subjected by immersion or pressurization or other means, to a neutralizer of the proper strength. In this subjection some deposition of salts occurs and presents further possible difficulties and expense, so that for practical purposes the use of ordinary steam under pressure, with little or no alkaline accelerator added, is to be preferred.

It will be observed that where cotton fibers are incorporated with the clay or other similar plastic material in the formation of the moldable plastic mass as described hereinabove, the presence of the fibers imparts to the finished product an internal structure which enhances durability and tensile strength proportional to the proportion of fibers and to the effectiveness of the particular silicon ester solution utilized in the above described process.

The cotton fibers interlock and hold the clay together while the penetration of the silicon ester solution and subsequent deposition of silicate dioxide in the innermost pores of the cotton and clay, increase the tensile strength of the fibers and enhances their bond with each other and with the clay particles, whereby the strength and cohesion and adhesion of the cotton fibers and of the clay particles are enhanced and cooperatively added to each other. It will also be observed that the strength, hardness, color, dielective properties, and other desirable properties of the final product extend throughout the cross section of the product and are not limited to surface areas thereof where the article has been completely immersed in the solution and subjected as an entirety to the hydrolyzing pressurization steps. However, it is contemplated that where desired the effects of the process may be localized and limited by suitable means, to predetermined areas of an article.

I claim as my invention:

1. A process of making a refractory mold comprising making a mixture of water, plastic clay, cotton fibers, and powdered graphite to the desired molding consistency, shaping the mixture to the desired mold form, drying the mold form, then immersing the mold form in a silicon ester solution devoid of hydrolysis accelerating agents so as to cause the pores of the clay and the fibers and graphite to absorb the solution, then removing the mold form from the solution and subjecting the same to water vapor under conditions of heat and pressure such as to hydrolyze the absorbed solution and cause precipitation therefrom of available silica, then further subjecting the mold form to heat and pressure so as to drive off solvent present in the solution and convert the precipitated silica into silicon dioxide forming a bond between the particles of clay and graphite and the cotton fibers.

2. A process of making a refractory mold comprising making a mixture of water, plastic clay, cotton fibers, and powdered graphite to the desired folding consistency, shaping the mixture to the desired mold form, drying the mold form, then immersing the mold form in a silicon ester solution devoid of hydrolysis accelerating agents so as to cause the pores of the clay and the fibers and graphite to absorb the solution, then removing the mold form from the solution and subjecting the same to water vapor under conditions of heat and pressure such as to hydrolize the absorbed solution and cause precipitation therefrom of available silica, said pressure varying from 10 to 550 pounds per square inch, then further subjecting the mold form to heat and pressure so as to drive off solvent present in the solution and convert the precipitated silica into silicon dioxide forming a bond between the particles of clay and graphite and the cotton fibers.

3. A process of making a refractory mold comprising making a mixture of water, plastic clay, cotton fibers, and powdered graphite to the desired molding consistency, shaping the mixture to the desired mold form, drying the mold form, then immersing the mold form in a silicon ester solution devoid of hydrolysis accelerating agents so as to cause the pores of the clay and the fibers and graphite to absorb the solution, then removing the mold form from the solution and subjecting the same to water vapor under conditions of heat and pressure such as to hydrolyze the absorbed solution and cause precipitation therefrom of available silica, said water vapor containing from 5% to 28% of ammonia, then further subjecting the mold form to heat and pressure so as to drive off solvent present in the solution and convert the precipitated silica into silicon dioxide forming a bond between the particles of clay and graphite and the cotton fibers.

4. A process of making a refractory mold comprising making a mixture of water, plastic clay, cotton fibers, and powdered graphite to the desired molding consistency, shaping the mixture to the desired mold form, drying the mold form, then immersing the mold form in a solution of silicon ester devoid of hydrolysis accelerating agents so as to cause the pores of the clay and the fibers and graphite to absorb the solution, then removing the mold form from the solution and subjecting the same to water vapor under conditions of heat and pressure such as to hydrolyze the absorbed solution and cause precipitation therefrom of available silica, said pressure varying from 10 to 550 pounds per square inch and said water vapor containing from 5% to 28% of ammonia, then further subjecting the mold form to heat and pressure so as to drive off solvent present in the solution and convert the precipitated silica into silicon dioxide forming a bond between the particles of clay and graphite and the cotton fibers.

FRED O. JOHNSON.

(References on following page)

REFERENCES CITED

The following references are of record in the file of this patent:

UNITED STATES PATENTS

| Number | Name | Date |
|---|---|---|
| 152,167 | Ransome | June 16, 1874 |
| 1,107,431 | Malinovszky | Aug. 18, 1914 |
| 1,561,988 | Laurie | Nov. 17, 1925 |
| 1,991,487 | Bemis | Feb. 19, 1935 |
| 2,027,931 | Ray | Jan. 14, 1936 |
| 2,201,840 | Venable | May 21, 1940 |
| 2,379,057 | Anderson | June 26, 1945 |

OTHER REFERENCES

Hertkorn, "Berichte Deut. Chem. Gess," vol. 18 (1885), p. 1682 (English translation in 260—448.8).

Journal Oil Colour Chemists Association, article by King, vol. 13, No. 116, pages 28–55, Feb 1930.